US012593043B2

(12) United States Patent
Chen et al.

(10) Patent No.: US 12,593,043 B2
(45) Date of Patent: Mar. 31, 2026

(54) VIDEO COMPRESSION AT SCENE CHANGES FOR LOW LATENCY INTERACTIVE EXPERIENCE

(71) Applicant: Adeia Guides Inc., San Jose, CA (US)

(72) Inventors: Tao Chen, Palo Alto, CA (US); Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 281 days.

(21) Appl. No.: 17/992,582

(22) Filed: Nov. 22, 2022

(65) Prior Publication Data

US 2024/0171741 A1     May 23, 2024

(51) Int. Cl.
| | |
|---|---|
| *H04N 19/124* | (2014.01) |
| *A63F 13/355* | (2014.01) |
| *H04N 19/146* | (2014.01) |
| *H04N 19/172* | (2014.01) |

(52) U.S. Cl.
CPC ......... *H04N 19/124* (2014.11); *H04N 19/146* (2014.11); *H04N 19/172* (2014.11); *A63F 13/355* (2014.09)

(58) Field of Classification Search
CPC .. H04N 19/124; H04N 19/146; H04N 19/172; A63F 13/355
See application file for complete search history.

(56) References Cited

U.S. PATENT DOCUMENTS

| | | | | |
|---|---|---|---|---|
| 6,661,840 B1 * | 12/2003 | Hiranaka | ............. | H04N 19/119 |
| | | | | 375/240.03 |
| 6,879,632 B1 * | 4/2005 | Yokoyama | ........... | H04N 19/177 |
| | | | | 375/E7.176 |
| 7,720,300 B1 * | 5/2010 | Malladi | .................. | H04N 19/14 |
| | | | | 382/251 |
| 10,341,670 B1 * | 7/2019 | Brailovskiy | ......... | H04N 19/146 |
| 10,887,601 B1 * | 1/2021 | Zhang | .................. | H04N 19/147 |
| 2001/0006562 A1 * | 7/2001 | Tajime | ................. | H04N 19/176 |
| | | | | 375/E7.181 |
| 2008/0259921 A1 * | 10/2008 | Nadarajah | ............. | H04L 65/611 |
| | | | | 370/390 |
| 2011/0176606 A1 * | 7/2011 | Fuchie | ................. | H04N 19/172 |
| | | | | 375/E7.139 |

(Continued)

OTHER PUBLICATIONS

"FAQ—Boosteroid Cloud Gaming," Boosteroid, boosteroid.com/ faq/, accessed Nov. 10, 2022 (3 pages).

(Continued)

*Primary Examiner* — Jeremiah C Hallenbeck-Huber
(74) *Attorney, Agent, or Firm* — HG LAW LLP

(57) ABSTRACT

Methods and systems for video compression at scene changes provide an improved, low latency interactive experience in cloud computing environments. Exemplary use cases include all forms of cloud gaming including cloud-enabled interactive sporting events, e-sports, fantasy sports, gaming, and enhancements. Improvements in performance and experience are achieved with at least one of an extreme low latency rate controller, an extreme low latency rate controller method, frame partitioning at scene changes, preventive (relatively early) termination of encoding at scene changes, interactive signaling between a decoder and an encoder, or interactive signaling. Related apparatuses, devices, techniques, and articles are also described.

20 Claims, 9 Drawing Sheets

(56) References Cited

U.S. PATENT DOCUMENTS

| | | | | |
|---|---|---|---|---|
| 2014/0321532 A1* | 10/2014 | Ghat | ................... | H04N 19/124 |
| | | | | 375/240.03 |
| 2016/0182906 A1* | 6/2016 | Panchagnula | ...... | H04N 21/2365 |
| | | | | 375/240.03 |
| 2016/0295250 A1* | 10/2016 | Yang | .............. | H04N 21/234363 |
| 2019/0166180 A1* | 5/2019 | Zhao | ................... | H04N 19/126 |
| 2019/0281300 A1* | 9/2019 | Guo | ................... | H04N 19/142 |
| 2019/0320193 A1* | 10/2019 | Mao | ................... | H04N 19/172 |
| 2021/0120230 A1* | 4/2021 | Zhu | ................... | H04N 19/172 |
| 2021/0194991 A1* | 6/2021 | Rickeby | ............. | H04N 21/2343 |

OTHER PUBLICATIONS

"Internet connection speed recommendations," Netflix, help.netflix. com/en/node/306, accessed Nov. 10, 2022 (2 pages).

"System Requirements for Cloud Gaming | Nvidia Geforce Now," Nvidia, nvidia.com/en-us/geforce-now/system-reqs/, accessed Nov. 10, 2022 (4 pages).

"Theoretical discussion on achieving rate control during encoding," PixelTools, pixeltools.com/rate_control_paper.html, accessed Nov. 10, 2022 (9 pages).

Park, S., et al., "Efficient QP-per-frame Assignment Method for Low-delay HEVC Encoder," Journal of Broadcast Engineering (2016) 21.3: 349-356 (Korean original with English abstract (8 pages), and full English translation of the same (8 pages)).

Sullivan, G., et al., "Joint Model Reference Encoding Methods and Decoding Concealment Methods," 9th JVT Meeting (JVT-I049d0), San Diego, CA, 2003 (39 pages).

"Stadia—One place for all the ways we play," stadia.google.com accessed Sep. 7, 2022 (1 page).

* cited by examiner

100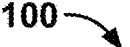
FIG. 1A
105
INPUT
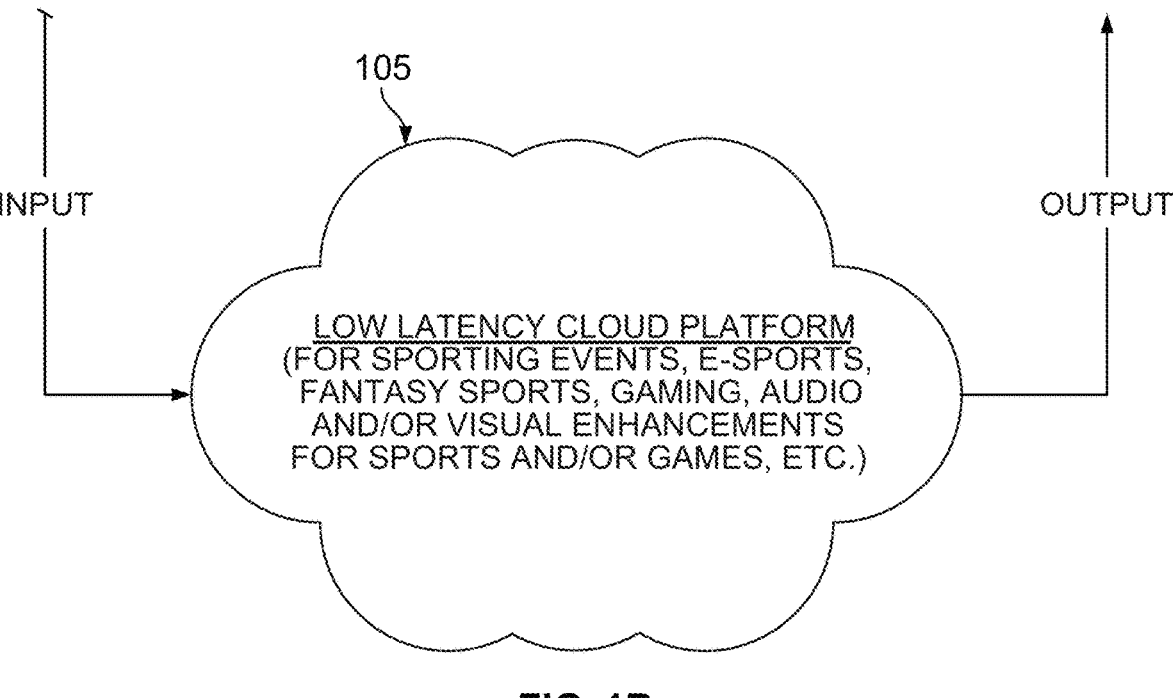
OUTPUT
LOW LATENCY CLOUD PLATFORM
(FOR SPORTING EVENTS, E-SPORTS,
FANTASY SPORTS, GAMING, AUDIO
AND/OR VISUAL ENHANCEMENTS
FOR SPORTS AND/OR GAMES, ETC.)
FIG. 1B

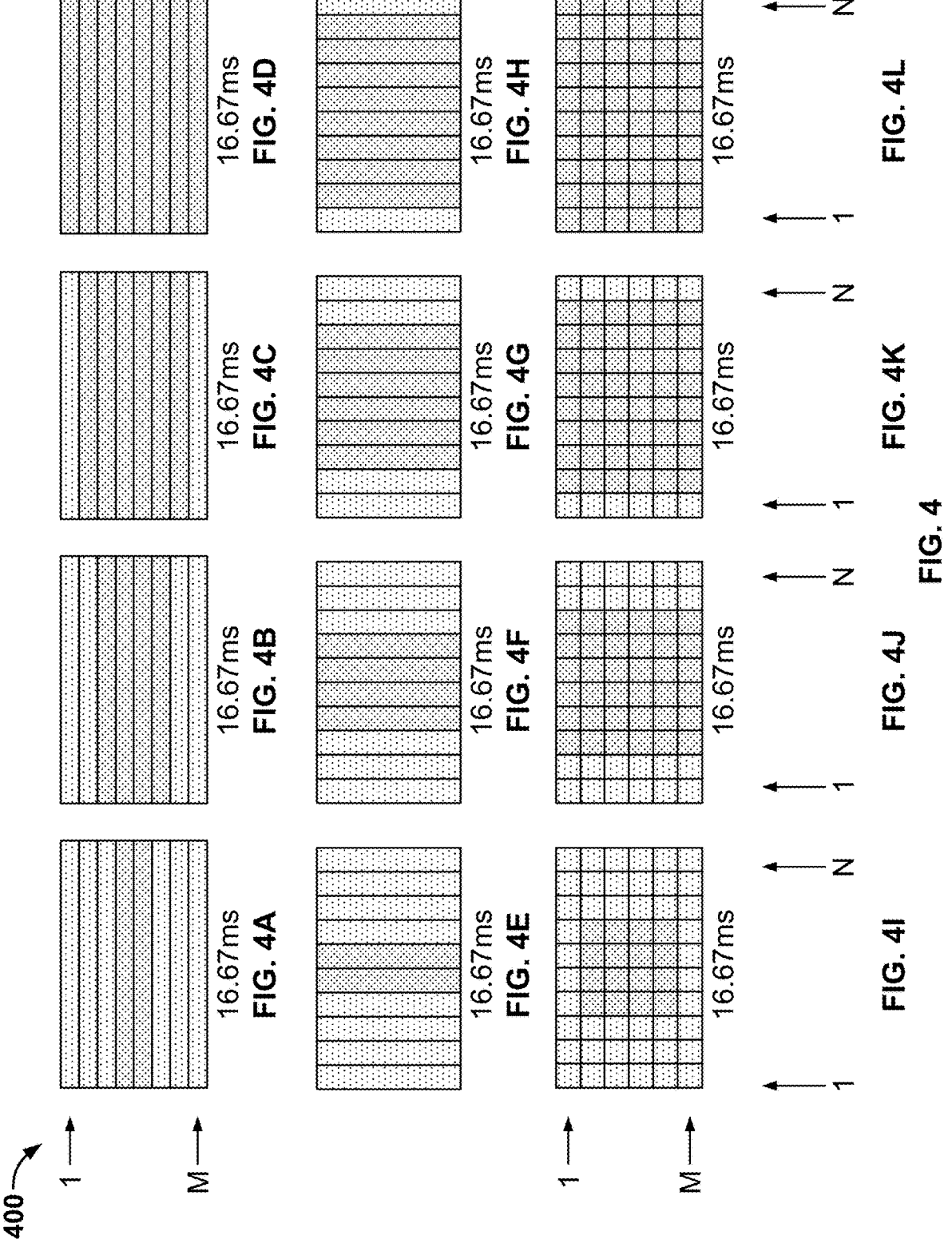

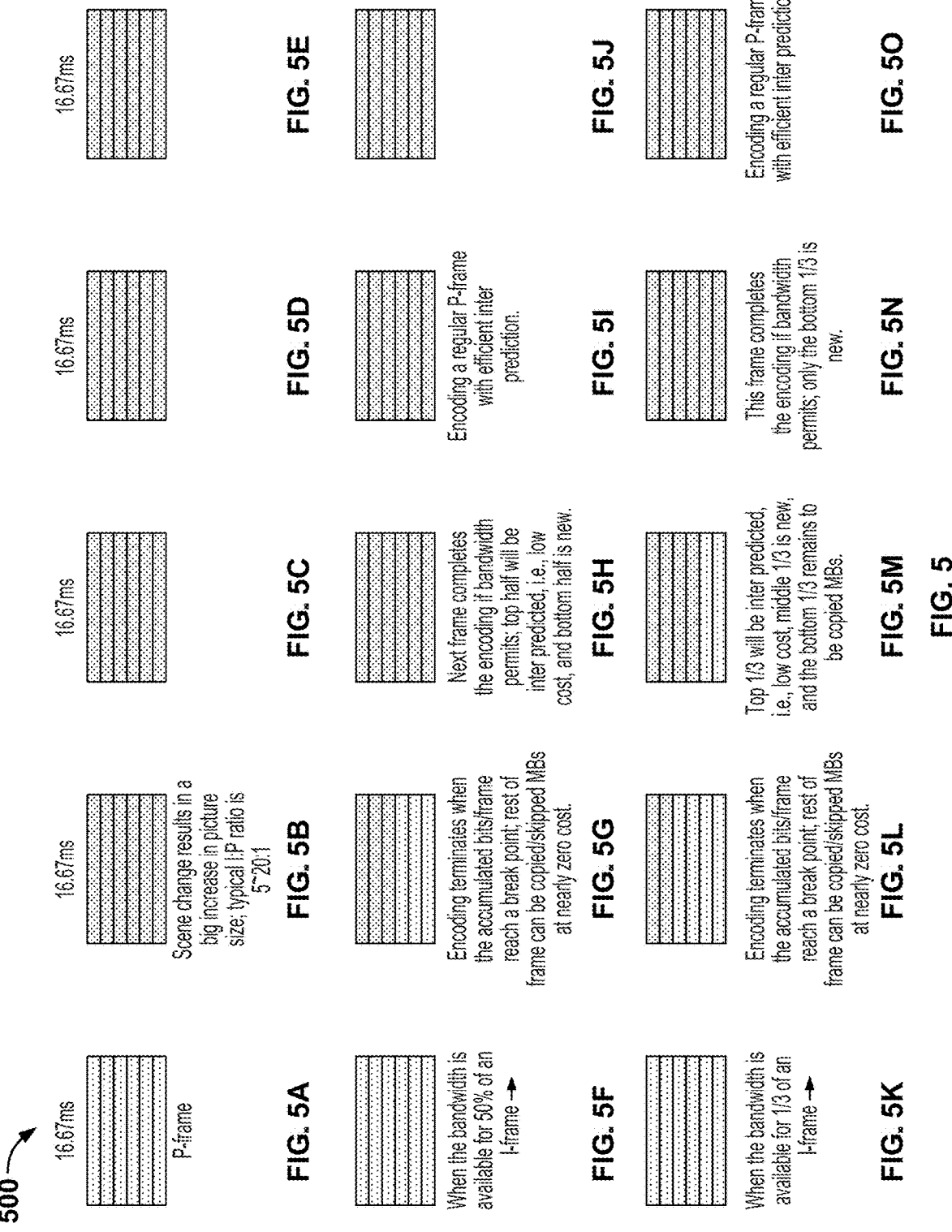

500

16.67ms

P-frame

Scene change results in a big increase in picture size; typical I:P ratio is 5~20:1

When the bandwidth is available for 50% of an I-frame →

FIG. 5F

Encoding terminates when the accumulated bits/frame reach a break point; rest of frame can be copied/skipped MBs at nearly zero cost.

FIG. 5G

Next frame completes the encoding if bandwidth permits; top half will be inter predicted, i.e., low cost, and bottom half is new.

FIG. 5H

Encoding a regular P-frame with efficient inter prediction.

When the bandwidth is available for 1/3 of an I-frame →

FIG. 5K

Encoding terminates when the accumulated bits/frame reach a break point; rest of frame can be copied/skipped MBs at nearly zero cost.

FIG. 5L

Top 1/3 will be inter predicted, i.e., low cost, middle 1/3 is new, and the bottom 1/3 remains to be copied MBs.

FIG. 5M

This frame completes the encoding if bandwidth permits; only the bottom 1/3 is new.

FIG. 5N

Encoding a regular P-frame with efficient inter prediction.

VIDEO COMPRESSION AT SCENE CHANGES FOR LOW LATENCY INTERACTIVE EXPERIENCE

BACKGROUND

The present disclosure relates to video compression and, more particularly, to video compression for interactive experiences, such as interactive experiences related to sporting events, e-sports, fantasy sports, gaming (including online gaming), audio and/or visual enhancements for sports and/or games, and the like. Among many implementations, certain examples are directed to e-sports, fantasy sports, gambling, betting, gaming, live streaming of the same, video enhancements for the same, and the like, but are not limited thereto.

Cloud gaming provides a highly interactive and engaging experience. By nature, gaming content often comes with quick scene changes. However, in conventional approaches, quick scene changes in cloud gaming environments present a challenge for video compression and live streaming systems, which are configured for low latency and minimal buffering. When network conditions deliver insufficient and/or fluctuating bandwidth, a relatively large picture (i.e., one encoded with a relatively large number of bits) is dropped, which results in a client device requesting an intra or Instantaneous Decoder Refresh (IDR) frame to refresh and restart gameplay.

Conventional native gaming experiences run a game off a disc or game files downloaded to a player's machine; whereas, cloud gaming is hosted on servers accessed through a browser or game application web client, and gameplay is then streamed to a user's device. Players do not need a conventional desktop computer or console with high computing power. A tablet, television, or mobile phone is sufficient for cloud gaming. Cloud platforms provide an option to remove the need to download or install the game, thus significantly reducing the time needed to start playing.

Cloud gaming is fully dependent on a constant and reliable network connection to allow for comfortable and smooth gameplay. Service providers such as cloud gaming platforms require varying levels of performance. For instance, as of the time of filing the present application, through Boosteroid, to play in full high definition (FHD) and 60 frames per second (fps), a minimum of 15 Mbps is required (Boosteroid, "FAQ," accessed Nov. 10, 2022, https://boosteroid.com/faq/). In the case of NVIDIA GeForce NOW (NVIDIA, "System Requirements," accessed Nov. 10, 2022, www.nvidia.com/en-us/geforce-now/system-reqs/), at least 15 Mbps for 720p at 60 fps and 25 Mbps for 1080p at 60 fps is required. Low latency (e.g., less than 80 microseconds (ms), preferably less than 40 ms) is recommended. In content delivery, Netflix recommends a bandwidth of 15 Mbps for watching movies in UHD 4K resolution (Netflix, "Internet connection speed recommendations," accessed Nov. 10, 2022, help.netflix.com/en/node/306).

When latencies fall below 20 ms and bandwidth is above 10 Mbps, there is a possibility of a near-native experience. Cloud gaming is often a game of milliseconds. Any latency or discontinuity such as recovery for a roundtrip as specified above makes the experience unsatisfactory and breaks a moment of engagement. In a worst case, risk of latency and/or discontinuity results in a reduction in a willingness to play.

Low latency is achieved by encoding and sending P-frames only, after an IDR-frame at initiation. With efficient inter-prediction, P-frames are usually encoded at a much lower bitrate than I-frames. At a scene change, a correlation between a current frame and a previous frame is reduced making conventional inter-prediction much less efficient, causing macroblocks in the P-frame to be encoded as intra blocks, and therefore increasing a number of bits for this P-frame.

Consequently, transmitting this P-frame requires a much higher bandwidth. However, when a spike associated with a relatively large picture exceeds network provisioning that allows variation in bitrate, problems arise. The large picture may not arrive in time, and thus cannot be decoded due to missing bits leading to an undesirable stall in gameplay. Under these conditions, a client-side device starts requesting an IDR for recovery. The IDR frame again is encoded as a large picture and results in a higher bitrate. It is noted that the term "picture" or the like as used herein may be used to refer to a "frame" or the like.

QPs may vary at the macroblock level and are not necessarily fixed for an entire picture. For instance, MPEG AVC supports a QP per slice or macroblock. Also, MPEG HEVC adds a QP per tile in addition to AVC. One or more slices per picture may be provided to permit adjustment of the QP per picture, slice, or macroblock. As noted in "Rate Control and H.264" (PixelTools, accessed Nov. 10, 2022, www.pixeltools.com/rate_control_paper.html), a "Basic Unit" was described (PixelTools at n. 4), and the Basic Unit is the basis for H.264 rate control recommendations (Pixel-Tools at n. 6, citing G. Sullivan, T. Wiegand and K. P. Lim, "Joint Model Reference Encoding Methods and Decoding Concealment Methods; Section 2.6: Rate Control" JVT-I049, San Diego, September 2003). With this approach, scalable rate control may be pursued to different levels of granularity—such as picture, slice, macroblock row or any contiguous set of macroblocks. That level is referred to as a Basic Unit at which rate control is resolved, and for which distinct values of QP are calculated. See, also, Park, Sang-hyo, and Euee S. Jang, "Efficient QP-per-frame Assignment Method for Low-delay HEVC Encoder," Journal of Broadcast Engineering 21.3 (2016): 349-356 (Korean original, with English translation). That is, the rate controller may be configured to make adjustments at different granularities.

As such, a need has arisen for methods and systems that overcome these problems and deliver improved performance with minimal impact on key interactive functions.

SUMMARY

Methods, systems, devices, techniques, and articles are described, that provide, among other advantages, efficient video compression at scene changes for a low latency consumption experience via a cloud platform and operatively connected client. The advantages disclosed herein are achieved in various embodiments, either alone or in any suitable combination, with at least one of an extreme low latency rate controller, an extreme low latency rate controller method, frame partitioning at scene changes, preventive (relatively early) termination of encoding at scene changes, or interactive signaling between a decoder of a client and an encoder of a cloud-based service. Related apparatuses, devices, techniques, and articles are also described.

In some embodiments, an improved Quality of Service (QoS) supplement including one or more of the methods and systems disclosed herein is provided for insufficient network conditions.

A method is provided for video compression. The method includes estimating, with a rate controller operatively connected with an encoder, a quantization parameter of at least a portion of a picture of a variable bitrate input. An encoded picture size of the picture is determined. A required rate based on the encoded picture size and a frame rate of the encoder is determined. A capped variable bitrate of the variable bitrate input is determined. The required bitrate is compared with the capped variable bitrate. The picture is transmitted or the quantization parameter is adjusted based on the comparing of the required bitrate and the capped variable bitrate.

When the quantization parameter is adjusted, in some embodiments, a starting quantization parameter is set equal to the quantization parameter of the at least the portion of the picture plus an interval. The interval is not necessarily limited. In some embodiments the interval is an integer, and the integer is 1. An ending quantization parameter is set equal to a maximum supported encoder quantization parameter value. The starting quantization parameter is compared to the ending quantization parameter. In response to determining that the starting quantization parameter is greater than the ending quantization parameter, a new quantization parameter is determined. The manner of determination of the new quantization parameter is not necessarily limited. In some embodiments, the new quantization parameter is determined based on the starting quantization parameter to the ending quantization parameter. The determination of the new quantization parameter is not necessarily limited. In some embodiments, the new quantization parameter is determined using a ratio of the starting quantization parameter to the ending quantization parameter. In some embodiments, the new quantization parameter is determined by dividing a sum of the starting quantization parameter and the ending quantization parameter by an integer such as 2 (the integer is not limited to 2). After the new quantization parameter is determined, an intra picture with the new quantization parameter is generated to repair a corrupt video stream. In some embodiments, an intra picture generation request with the new quantization parameter is sent to the encoder; and an intra picture with the new quantization parameter is generated with the encoder.

In response to determining that the starting quantization parameter is not less than or equal to the ending quantization parameter, the picture is modified by at least one of changing a resolution of the picture, changing a framerate of the picture, or reducing the encoded picture size of the picture, and transmitting the modified picture to the encoder.

In some embodiments, the encoded picture is received from the rate controller with a multiplexer. With the multiplexer, the encoded picture is combined with multimedia stream data from the variable bitrate input into an encoded video stream. The encoded video stream is transmitted to a client.

In cloud gaming, the client is often a "thin" client comprising a video decoder and a user interaction module, which allows for minimal client side computing power and ease of implementation. The thin client is configured to transmit user commands from the user interaction module to a cloud gaming platform. The cloud gaming platform receives the user commands. The user commands are processed by the cloud gaming platform with a thin client interaction module to generate game actions. A game logic module receives the game actions and generates game world changes. The game world changes are processed with a graphics processing unit (GPU) rendering module to generate a rendered scene. The rendered scene is received with the encoder.

After the receiving of the rendered scene with the encoder, the process may repeat for a next picture. That is, after processing a picture of a cloud gaming stream, the process continues with the estimating, with the rate controller operatively connected to the encoder, the quantization parameter of the next picture of the variable bitrate input; the determining of the encoded picture size of the next picture; the determining of the required rate based on the encoded picture size and the frame rate of the encoder; the determining of the capped variable bitrate of the variable bitrate input; the comparing of the required bitrate with the capped input; and the transmitting of the picture or at least one of partitioning a frame, reconfiguring a frame, or adjusting the quantization parameter based on the comparing.

Related video compression systems, apparatuses, devices, techniques, and articles are also described.

Although reference is made herein to a "cloud gaming platform" and the like, reference thereto is intended to be exemplary and non-limiting. The present methods, systems, apparatuses, devices, techniques, and articles are not limited to a cloud gaming platform and may be implemented for any remote or cloud-based platform, whether provided for gaming or otherwise, particularly those where the advantages disclosed herein are desired.

The present invention is not limited to the combination of the elements as listed herein and may be assembled in any combination of the elements as described herein.

These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein may be better understood by referring to the following description in conjunction with the accompanying drawings in which like reference numerals indicate identically or functionally similar elements, of which:

FIG. 1A depicts a group of gamers enjoying a low latency interactive experience via a cloud-based gaming platform operatively connected to a client device, in accordance with some embodiments of the disclosure;

FIG. 1B depicts a cloud including a low latency cloud platform configured to deliver the low latency interactive experience to the group of FIG. 1A, in accordance with some embodiments of the disclosure;

Figure 6:
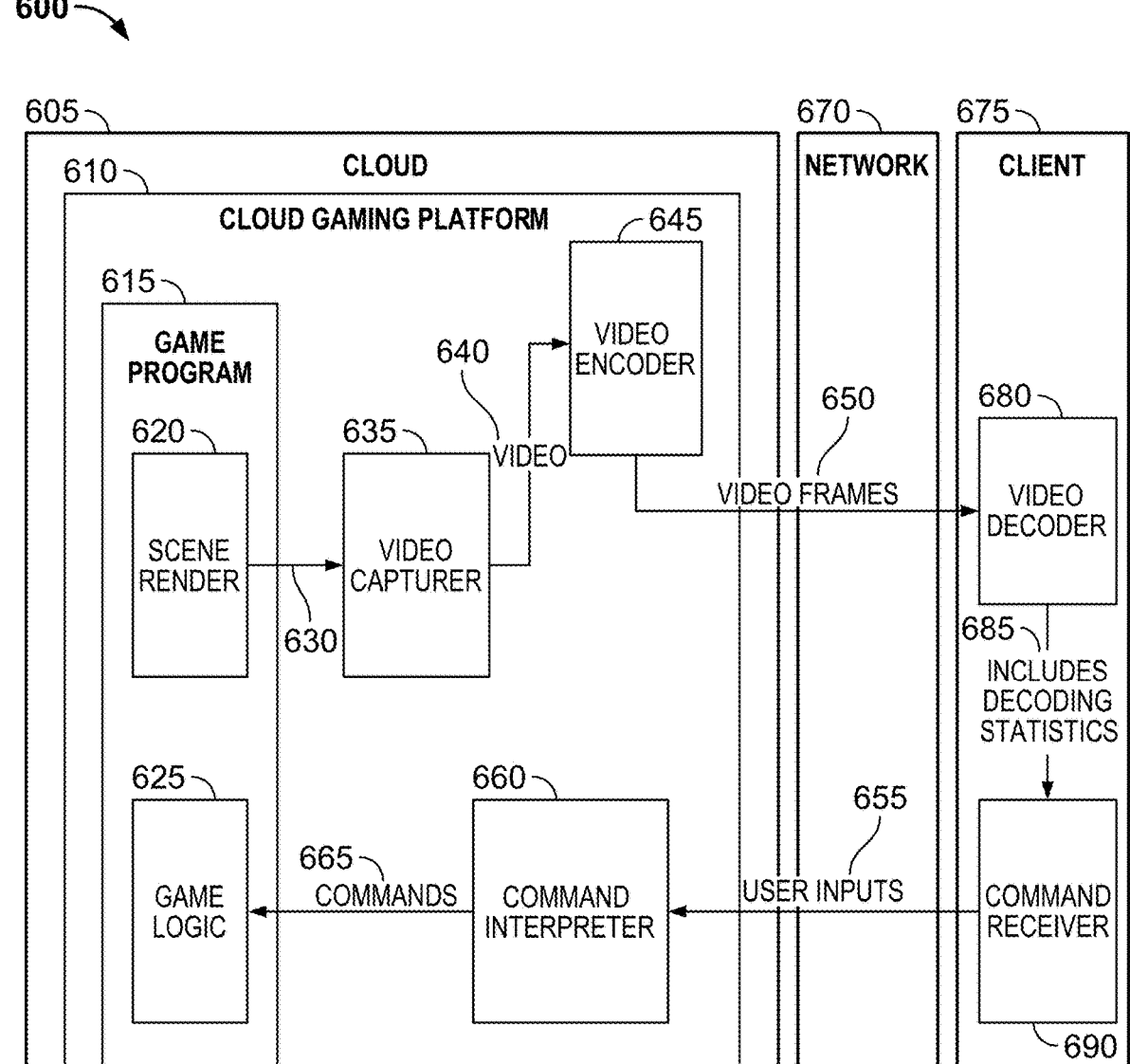
Figure 7:
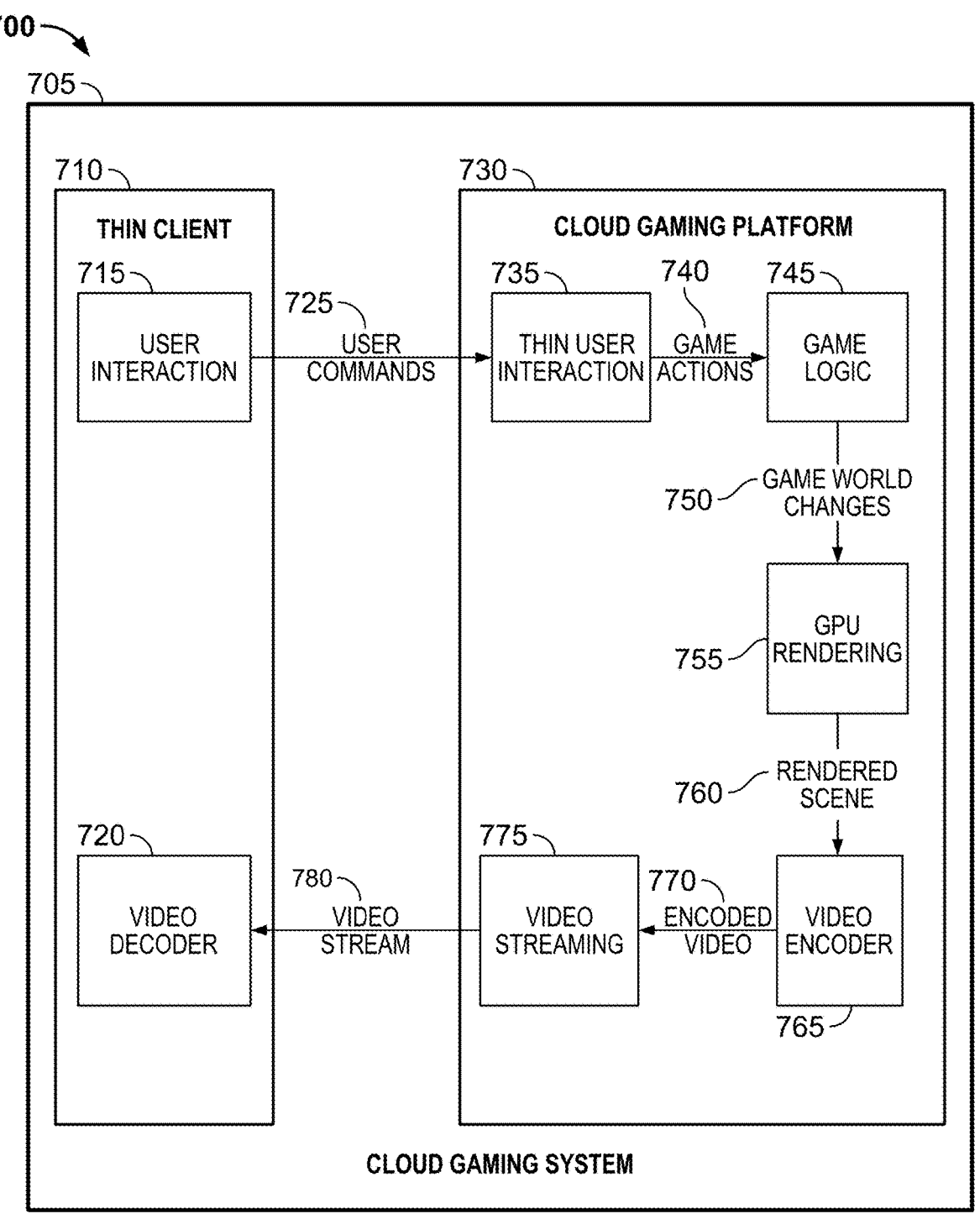
Figure 8:
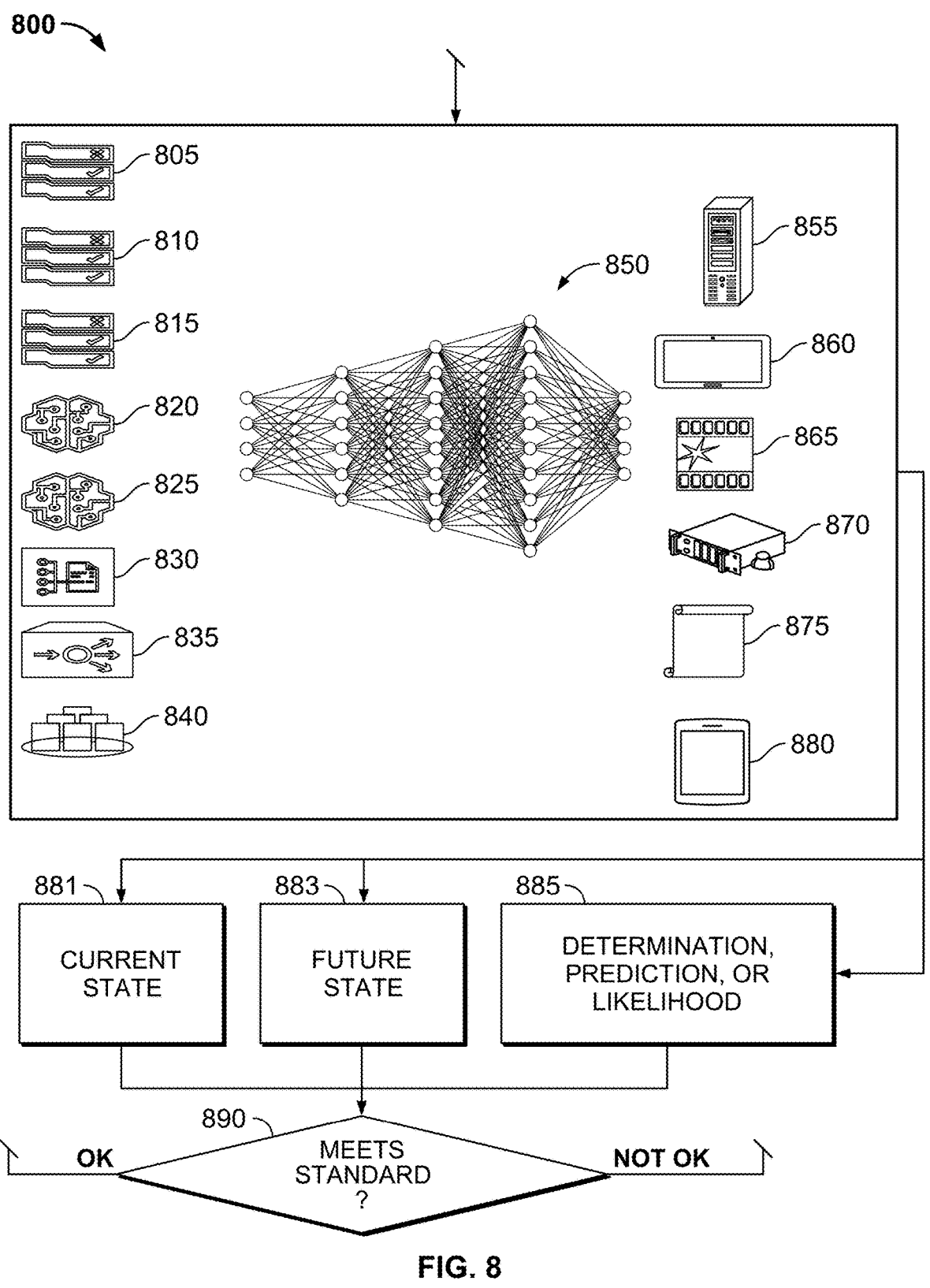
Figure 9:
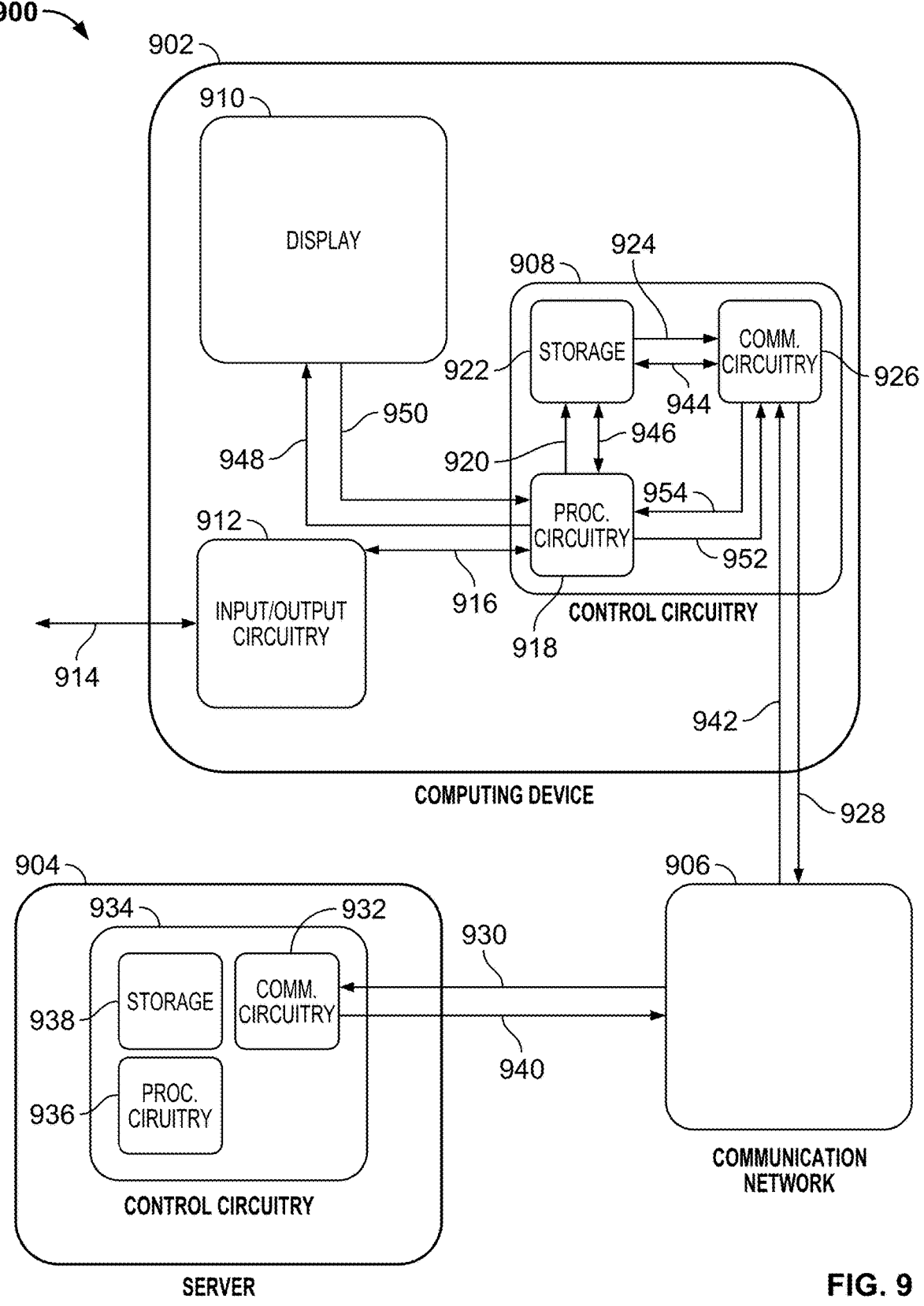

FIG. 4 depicts examples of partitioning of frames, in accordance with some embodiments of the disclosure including a first example (FIG. 4A), a second example (FIG. 4B), a third example (FIG. 4C), a fourth example (FIG. 4D), a fifth example (FIG. 4E), a sixth example (FIG. 4F), a seventh example (FIG. 4G), an eighth example (FIG. 4H), a ninth example (FIG. 4I), a tenth example (FIG. 4J), an eleventh example (FIG. 4K), and a twelfth example (FIG. 4L);

FIG. 5 depicts preventive (relatively early) termination of encoding at a scene change to avoid a relatively large picture, in accordance with some embodiments of the disclosure including a first example (FIG. 5A), a second example (FIG. 5B), a third example (FIG. 5C), a fourth example (FIG. 5D), a fifth example (FIG. 5E), a sixth example (FIG. 5F), a seventh example (FIG. 5G), a eighth example (FIG. 5H), a ninth example (FIG. 5I), a tenth example (FIG. 5J), an eleventh example (FIG. 5K), a twelfth example (FIG. 5L), a thirteenth example (FIG. 5M), a fourteenth example (FIG. 5N), and a fifteenth example (FIG. 5O);

FIG. 6 depicts interactive signaling between an encoder of a cloud gaming platform and a decoder of a client, in accordance with some embodiments of the disclosure;

FIG. 7 depicts a cloud gaming framework, in accordance with some embodiments of the disclosure;

FIG. 8 depicts an artificial intelligence system, in accordance with some embodiments of the disclosure; and FIG. 9 depicts a system including a server, a communication network, and a computing device for performing the methods and processes, in accordance with some embodiments of the disclosure.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary embodiments and that the scope of the present invention is defined solely by the claims.

DETAILED DESCRIPTION

Cloud platforms, including cloud gaming platforms, are increasing in popularity. Even with improvement in broadband connections, latency and degradation of the performance of cloud platforms remain challenges. For example, in cloud gaming, the server and client have an established channel for communication including requests and commands from a user device, and limited available bandwidth for the client to receive video content.

Gamers prefer to compromise video quality to gain smoother gameplay experience. The present methods and systems implement encoding options that are preventive and proactive to ensure continuous gaming with carefully controlled degradation and self-recovering picture quality. An improved encoder is provided to mitigate the above-referenced problems and prevent the associated system from stalling an interactive and engaging experience. Solutions are provided to promote minimized controlled degradation and avoid generating relatively large size pictures at scene changes.

Due to limited bandwidth, an encoder may increase the quantization parameter (QP) to reduce the picture size. However, there is an upper limit of QP values allowed by every coder/decoder (codec) specification. Sometimes, even with the maximum QP and highly degraded picture quality, the resultant picture size significantly exceeds what can be transmitted in time.

When a scene change occurs, the encoder should expect a large picture from encoding the first frame of a new scene. Live and relatively low latency cloud gaming desirably afford single pass encoding. There are significant challenges in bit allocation and rate control to achieve desirable performance. Unknown characteristics of the new scene impose unpredictability of a resultant bits per frame.

When the inter-prediction becomes less efficient, the macroblocks of new content are intra coded and the P-frame would equally require a high bitrate in order to transmit an I-frame. The large picture may cause frame dropping at the decoder. When frame dropping at the decoder occurs, what is most critical is to ensure gameplay continues, nonstop, with minimized controlled degradation.

Prediction and proactive operation in encoding are provided. Upon the completion of P-frame encoding at a scene change, the encoder is configured to predict a probability of the frame being received and decoded in time, e.g., 16.67 ms for 60 fps gaming. A high probability of the frame getting dropped would immediately trigger encoding the next frame into an IDR, which refreshes the decoding without being impacted by loss of the previous P-frame.

The proactive operation reduces the latency from a possible round trip after the client or user device initiates a request. That is, the preventive intra encoding anticipates the following intra coded frames to require a high bitrate. Therefore, the proactive operation and preventive intra encoding are highly desirable to ensure an increased probability of getting an I-frame over and decoded in time for continuing gameplay. The encoder implements a mechanism to increase the quantization that leads to a reduced picture size when the encoder is predicted to require and thus forced to encode multiple intra frames in a row.

Due to similar characteristics of neighboring frames in a same scene, the statistics from encoding the previous intra frame will help to better allocate bits and improve the rate control in encoding the current frame.

FIG. 1A depicts a group 100 of gamers enjoying a low latency interactive experience via a cloud-based gaming platform operatively connected to a client device. FIG. 1B depicts a cloud 105 including a low latency cloud platform configured to deliver the low latency interactive experience to the group 100 of FIG. 1A.

Figure 2:
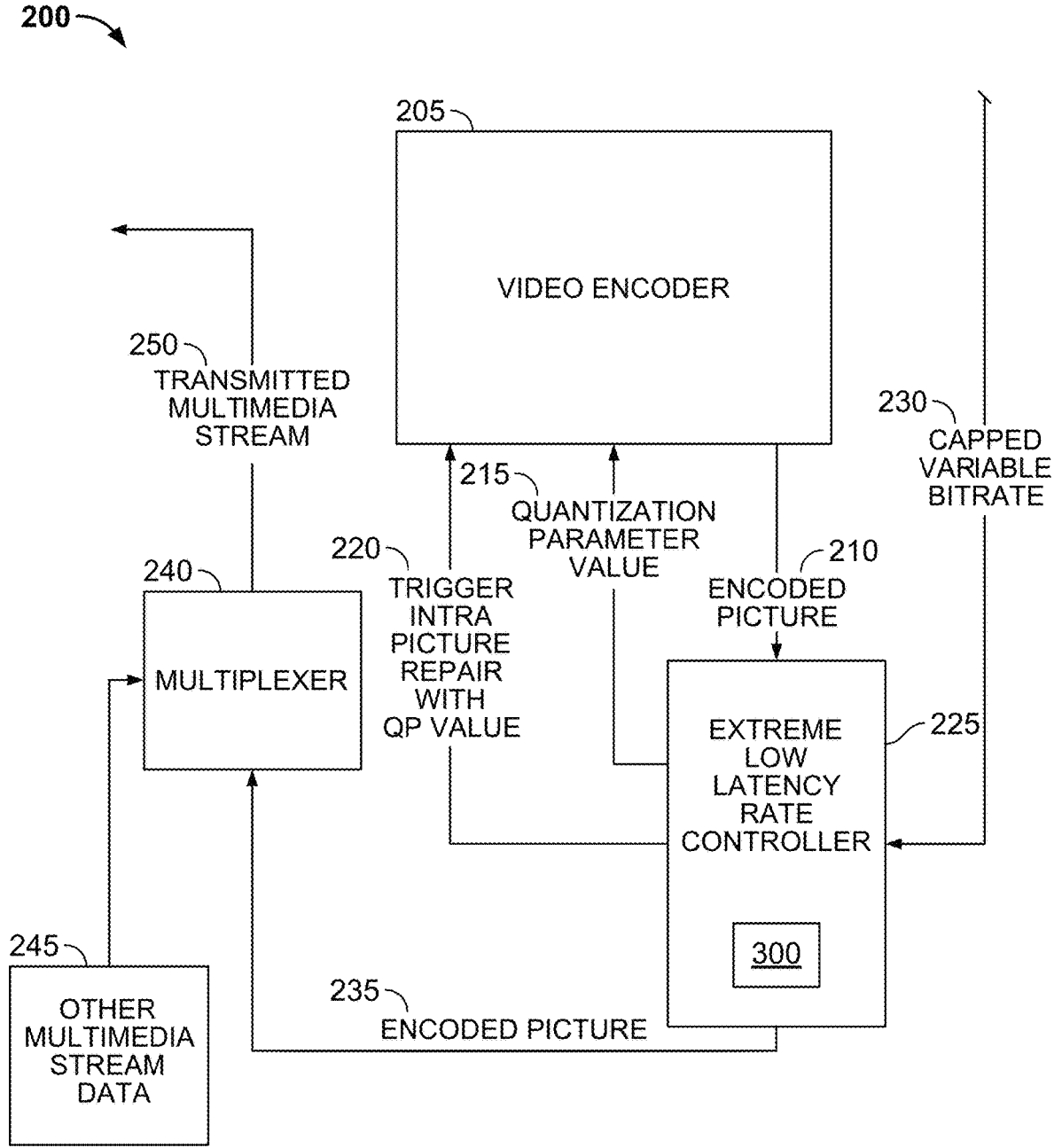
FIG. 2 depicts a low latency rate controller system including a video encoder, an extreme low latency rate controller, and, optionally, a multiplexer, in accordance with some embodiments of the disclosure.
Figure 3:
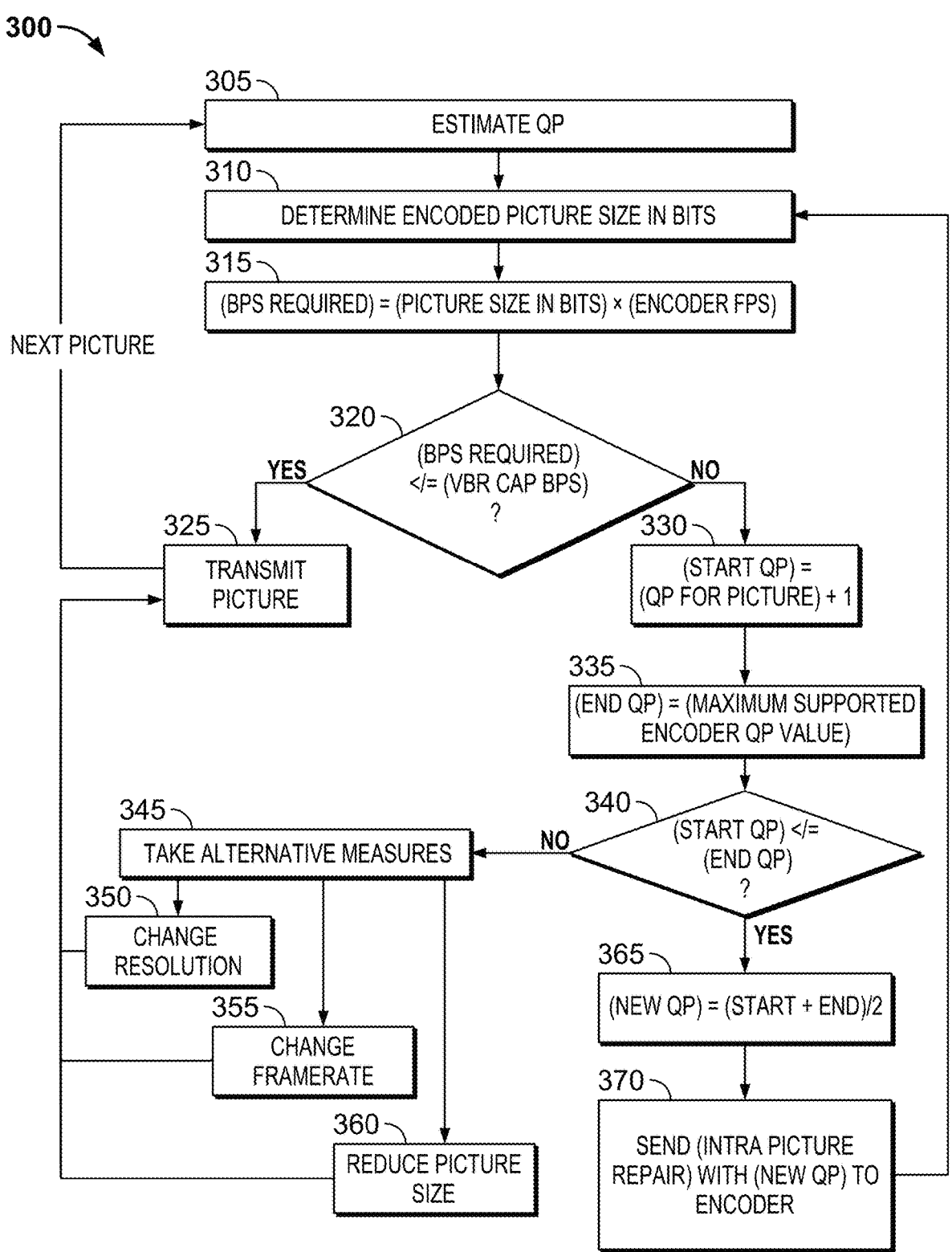
FIG. 3 depicts a rate controller process for the extreme low latency rate controller of FIG. 2, in accordance with some embodiments of the disclosure.

FIG. 2 shows an example of an interaction between a network rate controller and a video encoder. The flowchart in FIG. 3 illustrates operations to achieve the goal of delivering an encoded frame within a calculated bitrate allowance. Even with the highest QP values, there is still a possibility of the resultant picture size significantly exceeding what can be transmitted in time. This essentially forces a stall and requires a repair. To prevent a stall and repair process from being required, an encoder implements options to partition and configure a frame in various forms and enables an early termination when necessary to warrant each encoded frame to be received and decoded in time.

An extremely low latency rate controller and a rate controller calculation are provided. FIG. 2 is a block diagram of a system 200 including an extreme low latency rate controller 225 interacting with a video encoder 205. FIG. 3 depicts a process 300 of estimation and calculation of QP for achieving target picture size in video compression.

According to an exemplary embodiment, the system 200 includes a video encoder 205 operatively connected to a rate controller 225. The rate controller 225 is configured to receive a capped variable bitrate stream 230 as input. The rate controller 225 is configured to receive an encoded picture 210 from the video encoder 205. The rate controller 225 is configured to transmit a quantization parameter value 215 to the video encoder 205. The rate controller 225 is configured, in some embodiments, with a rate controller process 300 (described in more detail below). The rate controller 225 running the rate controller process 300 is configured to determine whether intra picture repair is required. The rate controller 225 is configured to repair an intra picture with a QP value. The rate controller 225 is configured to send an encoded picture 235, with or without an intra frame and repaired with the QP value (in some embodiments, depending on the logic of the process 300 of FIG. 3, described below) to a client device. In some embodiment, before transmitting a multimedia stream 250, a multiplexer 240 is provided. The multiplexer 240 is configured to receive other multimedia stream data 245 and combine the encoded picture 235 from the rate controller 225 into the transmitted multimedia stream 250.

Partitioning and re-configuring content processes are provided. FIG. 4 shows some examples of how a new frame is partitioned and re-created for improved encoding. In low latency cloud gaming of, for example, 60 fps, each frame is displayed and then refreshed in 16.67 ms. A transition of several continuous frames as illustrated in the examples would represent minimized controlled degradation in visual effect. The disclosed options prevent the gameplay from stopping. Hence, the partitioning and re-configuring content processes are a preventive means for prompt recovery if degradation is predicted and/or otherwise inevitable.

FIG. 3 depicts a rate controller process 300. The rate controller process 300 includes estimating 305, with the rate controller, a quantization parameter of at least a portion of a picture of a variable bitrate input such as the capped variable bitrate stream 230. The rate controller process 300 includes determining 310 an encoded picture size of the picture. The rate controller process 300 includes determining 315 a required rate based on the encoded picture size and a frame rate of the encoder. The rate controller process 300 includes determining a capped variable bitrate of the variable bitrate input (not shown). The rate controller process 300 includes comparing 320 the required bitrate with the capped variable bitrate. The rate controller process 300 includes transmitting 325 the picture. The rate controller process 300 includes at least one of partitioning a frame (e.g., FIG. 4), reconfiguring a frame (e.g., FIG. 5), or adjusting the quantization parameter based on the comparing (e.g., FIG. 3, steps 330 to 360).

For embodiments including adjusting the quantization parameter based on the comparing, the rate controller process 300 includes setting 330 a starting quantization parameter equal to the quantization parameter of the at least the portion of the picture plus an interval. In some embodiments, the interval is an integer, and the integer is 1. The rate controller process 300 includes setting 335 an ending quantization parameter equal to a maximum supported encoder quantization parameter value. The rate controller process 300 includes comparing 340 the starting quantization parameter to the ending quantization parameter. The rate controller process 300 includes, in response to determining that the starting quantization parameter is less than the ending quantization parameter (340=YES), setting 365 a new quantization parameter. In some embodiments, the new quantization parameter is determined based on the starting quantization parameter and the ending quantization parameter. For example, the new quantization parameter is determined using a ratio of the starting quantization parameter to the ending quantization parameter. The ratio is determined, in one embodiment, by dividing a sum of the starting quantization parameter and the ending quantization parameter by an integer such as 2 (the integer is not limited to 2). In one embodiment, the ratio of the starting quantization parameter to the ending quantization parameter is set at 1:2. The rate controller process 300 includes generating an intra picture with the new quantization parameter (to repair a corrupt video stream). The rate controller process 300 includes sending 370 an intra picture generation request with the new quantization parameter to the encoder 205 to generate an intra picture with the new quantization parameter. In some embodiments, an intra picture is sent for repair of at least one lost packet. In some instances, a complete loss of a P picture may occur, because the P picture did not arrive in time and could not be buffered on the client. The client runs without a buffer, and the client decodes and renders the slices or tiles as soon as possible. Any data arriving late can be lost without compromising the objective of the repair process.

The rate controller process 300 includes in response to determining that the starting quantization parameter is not less than or equal to the ending quantization parameter (step 340=NO), taking 345 alternative measures including modifying the picture by at least one of changing 350 a resolution of the picture, changing 355 a framerate of the picture (e.g., reducing the framerate), or reducing 360 the encoded picture size of the picture. The rate controller process 300 includes transmitting 325 the modified picture or the picture at the reduced framerate. In some embodiments, the modified picture or the picture at the reduced framerate are transmitted as encoded video.

In some embodiments, the rate controller process 300 includes receiving, from the rate controller 225, the encoded picture 235 with a multiplexer 240. The rate controller process 300 includes combining, with the multiplexer 240, the encoded picture 235 with multimedia stream data 245 from the variable bitrate input 230 into an encoded video stream or multimedia stream. The rate controller process 300 includes transmitting 250 the encoded video stream or multimedia stream to a client (described herein).

As shown in FIG. 7, a cloud gaming framework 700 is provided. The cloud gaming framework 700 includes a thin client 710 comprising a video decoder 720 and a user interaction module 715. The thin client 710 is configured to transmit user commands 725 from the user interaction module 715 to a cloud gaming platform 730. The cloud gaming platform 730 is configured to receive the user commands 725. The user commands 725 are processed with a thin client interaction module 735 to generate game actions 740. A game logic module 745 receives and processes the game actions 740 to generate game world changes 750. The game world changes 750 are processed with a graphics processing unit rendering module 755 configured to generate a rendered scene 760, which is transmitted to a video encoder 765. The video encoder 765 is configured to generate and transmit encoded video 770 to a video streaming module 775. The video streaming module 775 is configured to output a video stream 780.

After the rendered scene 760 is received with the encoder 765, the rate controller process 300 is configured to repeat for a next picture (FIG. 3). That is, the rate controller process 300 estimates 305, with the rate controller operatively connected to the encoder, the quantization parameter of the next picture of the variable bitrate input; determines 310 the encoded picture size of the next picture; determines 315 the required rate based on the encoded picture size and the frame rate of the encoder; determines the capped variable bitrate of the variable bitrate input; compares 320 the required bitrate with the capped variable bitrate; and transmits 325 the picture or adjusts the quantization parameter based on the comparing (e.g., steps 330 to 360).

FIG. 4 depicts examples of partitioning 400 frames in a row at a scene change. The darker-colored areas represent new picture data from a scene change, which are expected to be intra coded. The lighter-colored areas repeat the picture data from the previous scene and are encoded with skipped macroblocks. Skipped macroblocks require a minimum number of bits for signaling.

Essentially in a sequence of frames starting at a scene change, the number of intra coded macroblocks can be flexibly constrained. In other words, the intra coded macroblocks are now re-distributed into multiple frames in a row so that a drastic increase of bits in a single frame is circumvented. Note that, for simplicity, these macroblocks are referred to as intra coded macroblocks due to less efficient inter-prediction. Without loss of generality, the intra coded macroblocks are applicable to any large size macroblocks even if inter-prediction is decided by mode selection.

FIG. 4 illustrates the effects from different ways of aggregating macroblocks including a first example (FIG. 4A), a second example (FIG. 4B), a third example (FIG. 4C), a fourth example (FIG. 4D), a fifth example (FIG. 4E), a sixth example (FIG. 4F), a seventh example (FIG. 4G), an eighth example (FIG. 4H), a ninth example (FIG. 4I), a tenth example (FIG. 4J), an eleventh example (FIG. 4K), and a twelfth example (FIG. 4L). The different ways of aggregating macroblocks are flexible based on the calculated bandwidth, e.g., what percentage of new content can be accommodated without stopping the gameplay. The encoding of such non-skipped, intra macroblocks is configured to start from anywhere in a frame.

As a result, with the calculated bits per frame that can safely be transmitted and decoded within a frame duration, the region or coverage of macroblocks encoded for update is configured at the start of the encoding of the frame. Exemplary patterns are shown in FIG. 4, but the patterns are not limited to those illustrated in FIG. 4.

Multiple options in configuration are used together to avoid a single pattern of the resultant visual effect over time. In other words, variations are, in some embodiments, allowed and implemented randomly at different scene changes.

In each of the examples of FIG. 4, a frame is received and decoded in less than 16.67 ms for 60 fps gaming. In the first example (FIG. 4A), a frame is divided into M rows, where M=8 (for the sake of simplicity, but any suitable number M may be employed), rows 1-3 and 6-8 represent repeat picture data from a previous scene, which are encoded with skipped macroblocks (MBs), and rows 4 and 5 represent new picture data from a scene change. In the second example (FIG. 4B), where M=8, rows 1-2 and 7-8 represent repeat picture data from a previous scene, which are encoded with skipped MBs, and rows 3-6 represent new picture data from a scene change. In the third example (FIG. 4C), where M=8, rows 1 and 8 represent repeat picture data from a previous scene, which are encoded with skipped MBs, and rows 2-7 represent new picture data from a scene change. In the fourth example (FIG. 4D), where M=8, all rows 1-8 represent new picture data from a scene change.

In the fifth example (FIG. 4E), a frame is divided into N columns, where N=10 (for the sake of simplicity, but any suitable number N may be employed depending on frame format), columns 1-4 and 7-10 represent repeat picture data from a previous scene, which are encoded with skipped macroblocks (MBs), and columns 5 and 6 represent new picture data from a scene change. In the sixth example (FIG. 4F), where N=10, columns 1-3 and 8-10 represent repeat picture data from a previous scene, which are encoded with skipped MBs, and columns 4-7 represent new picture data from a scene change. In the seventh example (FIG. 4G), where N=10, columns 1-2 and 9-10 represent repeat picture data from a previous scene, which are encoded with skipped MBs, and columns 3-8 represent new picture data from a scene change. In the eighth example (FIG. 4H), where N=10, columns 1 and 10 represent repeat picture data from a previous scene, which are encoded with skipped MBs, and columns 2-9 represent new picture data from a scene change.

In the ninth example (FIG. 4I), a frame is divided into M rows×N columns, where M=6, N=10 (for the sake of simplicity, but any suitable numbers M, N may be employed), rows 1 and 6 and columns 1-3 and 8-10 represent repeat picture data from a previous scene, which are encoded with skipped macroblocks (MBs), and central portions of rows 2-5 and corresponding central portions of columns 4-7 represent new picture data from a scene change. In the tenth example (FIG. 4J), where M=6, N=10, columns 1-2 and 9-10 represent repeat picture data from a previous scene, which are encoded with skipped MBs, and columns 3-8 represent new picture data from a scene change. In the eleventh example (FIG. 4K), where M=6, N=10, columns 1 and 10 represent repeat picture data from a previous scene, which are encoded with skipped MBs, and columns 2-9 represent new picture data from a scene change. In the twelfth example (FIG. 4L), where M=6, N=10, all rows 1-6 or all columns 1-10 represent new picture data from a scene change.

With reference to FIG. 5, early termination of encoding is provided. There is unpredictability in single pass encoding, and the unpredictability increases at encoding a frame from a scene change. In some embodiments, the combination of bit allocation, mode selection and rate control result in generating a number of bits that exceeds the calculated allowance. Processes are implemented to enable a tighter management of data size from encoding.

Specifically, FIG. 5 presents examples (FIGS. 5A to 5O) of early termination to avoid increasing bits for the current frame. The processes of FIG. 5 are independent of the partitioning macroblocks and can start from the beginning of first macroblocks in a raster scan order. In some embodiments, the processes of FIG. 5 are coupled with the re-configuration of macroblocks as shown in FIG. 4. For the sake of simplicity, each frame is divided into six rows (M=6), but, as in FIG. 4 above, any suitable number or configuration may be provided, and any of the formats shown in FIG. 4 may be employed instead of six rows.

In the example of FIGS. 5A to 5E, in the first 16.67 ms, as shown in FIG. 5A, all six rows of a P-frame include repeat picture data from a previous scene and are encoded with skipped MBs. Beginning at the second interval of 16.67 ms (FIG. 5B) and in each subsequent interval (FIGS. 5C to 5E), a scene change results in a relatively big increase in picture size where a typical I:P ratio is 5~20:1.

In the example of FIGS. 5F to 5J, in the first 16.67 ms, as shown in FIG. 5F, again, all six rows of a P-frame include repeat picture data from a previous scene and are encoded with skipped MBs; however, in this example, the bandwidth is available for about one-half (50%) of an I-frame. In the second interval of 16.67 ms (FIG. 5G), encoding terminates when the accumulated bits/frame reach a break point; the rest of the frame can be copied or include skipped MBs at nearly zero cost. In the third interval of 16.67 ms (FIG. 5H), the next frame completes the encoding if bandwidth permits; a top half is inter-predicted, i.e., low cost, and a bottom half is new. In the fourth and fifth intervals of 16.67 ms (FIGS. 5I and 5J), a regular P-frame is encoded with efficient inter-prediction.

The example of FIGS. 5K to 5O is similar to the example of FIGS. 5F to 5J except the bandwidth is available for about one-third (33.3%) of an I-frame. In the first 16.67 ms, as shown in FIG. 5K, again, all six rows of a P-frame include repeat picture data from a previous scene and are encoded with skipped MBs. In the second interval of 16.67 ms (FIG. 5L), encoding terminates when the accumulated bits/frame reach a break point; the rest of the frame can be copied or include skipped MBs at nearly zero cost. In the third interval of 16.67 ms (FIG. 5M), a top third is inter-predicted, i.e., the middle third is new, and the bottom third remains to be copied MBs. In the fourth interval of 16.67 ms (FIG. 5N), the frame completes the encoding if bandwidth permits; only the bottom third is new. In the fifth interval of 16.67 ms (FIG. 5)), a regular P-frame is encoded with efficient inter-prediction.

Collaborative encoding and decoding are provided. The disclosed preventive encodings are single ended. In some embodiments, an even more efficient adaptation is enabled by implementing the server and client to collaborate for an improved experience.

In the single-ended case, the optimization is based on bandwidth estimated over prior knowledge, and the optimization also assumes that the decoder starts decoding when the bits of a frame are completely available in the buffer. A frame may get dropped if some bits are not available in time, e.g., missing the start code of next frame.

FIG. 6. illustrates interactive signaling between decoder and encoder, i.e., collaborative encoding and decoding. A system 600 includes a cloud 605, which is operatively connected to a network 670, which is operatively connected to a client 675. The cloud 605 includes a cloud gaming platform 610. The cloud gaming platform 610 includes a game program module 615, which communicates with a video capturer module 635, which communicates with a video encoder module 645. The cloud gaming platform 610 includes a command interpreter module 660, which communicates with the game program module 615. The game program module 615 includes a scene reader module 620, which communicates with a game logic module 625.

In an exemplary mode of operation, the scene reader module 620 of the game program module 615 is configured to transmit 630 a rendered scene to the video capturer module 635, which is configured to transmit 640 video to the video encoder module 645, which is configured to transmit 650 video frames across the network 670 to the client 675, which is configured to receive the video frames 650 with a video decoder module 680, which communicates with a command receiver module 690 of the client 675. The video decoder module 680 is configured to transmit 685 decoding statistics to the command receiver module 690, which is configured to transmit 655 user inputs across the network 670 to the command interpreter module 660 of the cloud gaming platform 610. The command interpreter module 660 is configured to transmit 665 commands to the game logic module 625 of the game program module 615, which is configured to communicate with the scene reader module 620 of the game program module 615.

In the low latency case, decoding may start from receipt of a partial frame, i.e., at least one slice, at least one tile, a few macroblocks, or macroblock rows to start with. In response to determination of an unpredictable and fluctuating network condition, the decoder at the client is configured to automatically decode the macroblocks received in time and skip the rest (assuming the rest of the macroblocks are encoded in skipped mode). The decoder then signals the position of macroblocks that are to be updated, and downstream processes respond accordingly, as shown in FIG. 6.

With such interactive signaling, the gameplay is made continuous and smooth. The pictures are updated over time and picture quality improves without obvious artifacts due to missing macroblocks. That is, interactive signaling avoids problems occurring with conventional approaches, which allow artifacts due to missing macroblocks to propagate and persist by conventional inter-prediction and compensation processes.

FIG. 7 illustrates a framework 700 of a cloud gaming system 705. The cloud gaming system 705 includes a thin client 710 operatively connected to a cloud gaming platform 730. The thin client 710 collects user interactions (e.g., instructions and requests) from a user device 715 and sends 725 user commands (e.g., the instructions and requests) to the cloud gaming platform 730 for rendering in response to the user commands inputted into the user device 715. Specifically, the cloud gaming platform 730 includes at least one of a thin client interaction module 735, a game logic module 745, a graphics processing unit (GPU) rendering module 755, a video encoder module 765, or a video streaming module 775. The thin client interaction module 735 of the cloud gaming platform 730 receives 725 the user commands from the thin client 710. The thin client interaction module 735 sends 740 game actions to the game logic module 745, which sends 750 game world changes to the graphics processing unit (GPU) rendering module 755, which sends 760 a rendered scene to the video encoder module 765, which sends 770 encoded video to the video streaming module 775, which sends 780 a video stream to a video decoder 720 of the thin client 710.

Systems 600 and 700 are exemplary and not intended to be limiting. Any suitable combination of modules may be provided to perform one or more of the functions disclosed herein without limitation.

One or more of the functions disclosed herein may be operatively coupled to a local or remote predictive model, which is trained in advance or trained in real time.

Predictive Model

Throughout the present disclosure, determinations, predictions, likelihoods, and the like are determined with one or more predictive models. For example, FIG. 8 depicts a predictive model. A prediction process 800 includes a predictive model 850 in some embodiments. The predictive model 850 receives as input various forms of data about one, more or all the users, media content items, devices, and data described in the present disclosure. The predictive model 850 performs analysis based on at least one of hard rules, learning rules, hard models, learning models, usage data, load data, analytics of the same, metadata, or profile information, and the like. The predictive model 850 outputs one or more predictions of a future state of any of the devices described in the present disclosure. A load-increasing event is determined by load-balancing techniques, e.g., least connection, least bandwidth, round robin, server response time, weighted versions of the same, resource-based techniques, and address hashing. The predictive model 850 is based on input including at least one of a hard rule 805, a user-defined rule 810, a rule defined by a content provider 815, a hard model 820, or a learning model 825.

The predictive model 850 receives as input usage data 830. The predictive model 850 is based, in some embodiments, on at least one of a usage pattern of the user or media device, a usage pattern of the requesting media device, a usage pattern of the media content item, a usage pattern of the communication system or network, a usage pattern of the profile, or a usage pattern of the currently streaming media device.

The predictive model 850 receives as input load-balancing data 835. The predictive model 850 is based on at least one of load data of the display device, load data of the requesting media device, load data of the media content item, load data of the communication system or network, load data of the profile, or load data of the currently streaming media device.

The predictive model 850 receives as input metadata 840. The predictive model 850 is based on at least one of metadata of the streaming service, metadata of the requesting media device, metadata of the media content item, metadata of the communication system or network, metadata of the profile, or metadata of the currently streaming media device. The metadata includes information of the type represented in the media device manifest.

The predictive model 850 is trained with data. The training data is developed in some embodiments using one or more data techniques including but not limited to data selection, data sourcing, and data synthesis. The predictive model 850 is trained in some embodiments with one or more analytical techniques including but not limited to classification and regression trees (CART), discrete choice models, linear regression models, logistic regression, logit versus probit, multinomial logistic regression, multivariate adaptive regression splines, probit regression, regression techniques, survival or duration analysis, and time series models. The predictive model 850 is trained in some embodiments with one or more machine learning approaches including but not limited to supervised learning, unsupervised learning, semi-supervised learning, reinforcement learning, and dimensionality reduction. The predictive model 850 in some embodiments includes regression analysis including analysis of variance (ANOVA), linear regression, logistic regression, ridge regression, and/or time series. The predictive model 850 in some embodiments includes classification analysis including decision trees and/or neural networks. In FIG. 8, a depiction of a multi-layer neural network is provided as a non-limiting, exemplary predictive model 850, the exemplary neural network including an input layer (left side), three hidden layers (middle), and an output layer (right side) with 32 neurons and 192 edges, which is intended to be illustrative, not limiting. The predictive model 850 is based on data engineering and/or modeling techniques. The data engineering techniques include exploration, cleaning, normalizing, feature engineering, and scaling. The modeling techniques include model selection, training, evaluation, and tuning. The predictive model 850 is operationalized using registration, deployment, monitoring, and/or retraining techniques.

The predictive model 850 is configured to output a current state 881, and/or a future state 883, and/or a determination, a prediction, or a likelihood 885, and the like.

The current state 881, and/or the future state 883, and/or the determination, the prediction, or the likelihood 885, and the like may be compared 890 to a predetermined or determined standard. In some embodiments, the standard is satisfied (890=OK) or rejected (890=NOT OK). If the standard is satisfied or rejected, the predictive process 800 outputs at least one of the current state, the future state, the determination, the prediction, or the likelihood to any device or module disclosed herein.

Communication System

FIG. 9 depicts a block diagram of system 900, in accordance with some embodiments. The system is shown to include computing device 902, server 904, and a communication network 906. It is understood that while a single instance of a component may be shown and described relative to FIG. 9, additional instances of the component may be employed. For example, server 904 may include, or may be incorporated in, more than one server. Similarly, communication network 906 may include, or may be incorporated in, more than one communication network. Server 904 is shown communicatively coupled to computing device 902 through communication network 906. While not shown in FIG. 9, server 904 may be directly communicatively coupled to computing device 902, for example, in a system absent or bypassing communication network 906.

Communication network 906 may include one or more network systems, such as, without limitation, the Internet, LAN, Wi-Fi, wireless, or other network systems suitable for audio processing applications. The system 900 of FIG. 9 excludes server 904, and functionality that would otherwise be implemented by server 904 is instead implemented by other components of the system depicted by FIG. 9, such as one or more components of communication network 906. In still other embodiments, server 904 works in conjunction with one or more components of communication network 906 to implement certain functionality described herein in a distributed or cooperative manner. Similarly, the system depicted by FIG. 9 excludes computing device 902, and functionality that would otherwise be implemented by computing device 902 is instead implemented by other components of the system depicted by FIG. 9, such as one or more components of communication network 906 or server 904 or a combination of the same. In other embodiments, computing device 902 works in conjunction with one or more components of communication network 906 or server 904 to implement certain functionality described herein in a distributed or cooperative manner.

Computing device 902 includes control circuitry 908, display 910 and input/output (I/O) circuitry 912. Control circuitry 908 may be based on any suitable processing circuitry and includes control circuits and memory circuits, which may be disposed on a single integrated circuit or may be discrete components. As referred to herein, processing circuitry should be understood to mean circuitry based on at least one microprocessors, microcontrollers, digital signal processors, programmable logic devices, field-programmable gate arrays (FPGAs), or application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 908 in turn includes communication circuitry 926, storage 922 and processing circuitry 918. Either of control circuitry 908 and 934 may be utilized to execute or perform any or all the methods, processes, and outputs of one or more of FIGS. 1A-8, or any combination of steps thereof (e.g., as enabled by processing circuitries 918 and 936, respectively).

In addition to control circuitry 908 and 934, computing device 902 and server 904 may each include storage (storage 922, and storage 938, respectively). Each of storages 922 and 938 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 8D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 922 and 938 may be used to store various types of content, metadata, and/or other types of data. Non-volatile memory may also be used (e.g., to launch a boot-up routine and other instructions). Cloud-based storage may be used to supplement storages 922 and 938 or instead of storages 922 and 938. In some embodiments, a user profile and messages corresponding to a chain of communication may be stored in one or more of storages 922 and 938. Each of storages 922 and 938 may be utilized to store commands, for example, such that when each of processing circuitries 918 and 936, respectively, are prompted through control circuitries 908 and 934, respectively. Either of processing circuitries 918 or 936 may execute any of the methods, processes, and outputs of one or more of FIGS. 1A-8, or any combination of steps thereof.

In some embodiments, control circuitry 908 and/or 934 executes instructions for an application stored in memory (e.g., storage 922 and/or storage 938). Specifically, control circuitry 908 and/or 934 may be instructed by the application to perform the functions discussed herein. In some embodiments, any action performed by control circuitry 908 and/or 934 may be based on instructions received from the application. For example, the application may be implemented as software or a set of and/or one or more executable instructions that may be stored in storage 922 and/or 938 and executed by control circuitry 908 and/or 934. The application may be a client/server application where only a client application resides on computing device 902, and a server application resides on server 904.

The application may be implemented using any suitable architecture. For example, it may be a stand-alone application wholly implemented on computing device 902. In such an approach, instructions for the application are stored locally (e.g., in storage 922), and data for use by the application is downloaded on a periodic basis (e.g., from an out-of-band feed, from an Internet resource, or using another suitable approach). Control circuitry 908 may retrieve instructions for the application from storage 922 and process the instructions to perform the functionality described herein. Based on the processed instructions, control circuitry 908 may determine a type of action to perform in response to input received from I/O circuitry 912 or from communication network 906.

In client/server-based embodiments, control circuitry 908 may include communication circuitry suitable for communicating with an application server (e.g., server 904) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 906). In another example of a client/server-based application, control circuitry 908 runs a web browser that interprets web pages provided by a remote server (e.g., server 904). For example, the remote server may store the instructions for the application in a storage device.

The remote server may process the stored instructions using circuitry (e.g., control circuitry 934) and/or generate displays. Computing device 902 may receive the displays generated by the remote server and may display the content of the displays locally via display 910. For example, display 910 may be utilized to present a string of characters. This way, the processing of the instructions is performed remotely (e.g., by server 904) while the resulting displays, such as the display windows described elsewhere herein, are provided locally on computing device 904. Computing device 902 may receive inputs from the user via input/output circuitry 912 and transmit those inputs to the remote server for processing and generating the corresponding displays.

Alternatively, computing device 902 may receive inputs from the user via input/output circuitry 912 and process and display the received inputs locally, by control circuitry 908 and display 910, respectively. For example, input/output circuitry 912 may correspond to a keyboard and/or a set of and/or one or more speakers/microphones which are used to receive user inputs (e.g., input as displayed in a search bar or a display of FIG. 9 on a computing device). Input/output circuitry 912 may also correspond to a communication link between display 910 and control circuitry 908 such that display 910 updates in response to inputs received via input/output circuitry 912 (e.g., simultaneously update what is shown in display 910 based on inputs received by generating corresponding outputs based on instructions stored in memory via a non-transitory, computer-readable medium).

Server 904 and computing device 902 may transmit and receive content and data such as media content via communication network 906. For example, server 904 may be a media content provider, and computing device 902 may be a smart television configured to download or stream media content, such as a live news broadcast, from server 904. Control circuitry 934, 908 may send and receive commands, requests, and other suitable data through communication network 906 using communication circuitry 932, 926, respectively. Alternatively, control circuitry 934, 908 may communicate directly with each other using communication circuitry 932, 926, respectively, avoiding communication network 906.

It is understood that computing device 902 is not limited to the embodiments and methods shown and described herein. In nonlimiting examples, computing device 902 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 902 receives user input 914 at input/output circuitry 912. For example, computing device 902 may receive a user input such as a user swipe or user touch. It is understood that computing device 902 is not limited to the embodiments and methods shown and described herein.

User input 914 may be received from a user selection-capturing interface that is separate from device 902, such as a remote-control device, trackpad, or any other suitable user movement-sensitive, audio-sensitive or capture devices, or as part of device 902, such as a touchscreen of display 910. Transmission of user input 914 to computing device 902 may be accomplished using a wired connection, such as an audio cable, USB cable, ethernet cable and the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, or any other suitable wireless transmission protocol. Input/output circuitry 912 may include a physical input port such as a 12.5 mm (0.4921 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 918 may receive user input 914 from input/output circuitry 912 using communication path 916. Processing circuitry 918 may convert or translate the received user input 914 that may be in the form of audio data, visual data, gestures, or movement to digital signals. In some embodiments, input/output circuitry 912 performs the translation to digital signals. In some embodiments, processing circuitry 918 (or processing circuitry 936, as the case may be) carries out disclosed processes and methods.

Processing circuitry 918 may provide requests to storage 922 by communication path 920. Storage 922 may provide requested information to processing circuitry 918 by communication path 946. Storage 922 may transfer a request for information to communication circuitry 926 which may translate or encode the request for information to a format receivable by communication network 906 before transferring the request for information by communication path 928. Communication network 906 may forward the translated or encoded request for information to communication circuitry 932, by communication path 930.

At communication circuitry 932, the translated or encoded request for information, received through communication path 930, is translated or decoded for processing circuitry 936, which will provide a response to the request for information based on information available through control circuitry 934 or storage 938, or a combination thereof. The response to the request for information is then provided back to communication network 906 by communication path 940 in an encoded or translated format such that communication network 906 forwards the encoded or translated response back to communication circuitry 926 by communication path 942.

At communication circuitry 926, the encoded or translated response to the request for information may be provided directly back to processing circuitry 918 by communication path 954 or may be provided to storage 922 through communication path 944, which then provides the information to processing circuitry 918 by communication path 946. Processing circuitry 918 may also provide a request for information directly to communication circuitry 926 through communication path 952, where storage 922 responds to an information request (provided through communication path 920 or 944) by communication path 924 or 946 that storage 922 does not contain information pertaining to the request from processing circuitry 918.

Processing circuitry 918 may process the response to the request received through communication paths 946 or 954 and may provide instructions to display 910 for a notification to be provided to the users through communication path 948. Display 910 may incorporate a timer for providing the notification or may rely on inputs through input/output circuitry 912 from the user, which are forwarded through processing circuitry 918 through communication path 948, to determine how long or in what format to provide the notification. When display 910 determines the display has been completed, a notification may be provided to processing circuitry 918 through communication path 950.

The communication paths provided in FIG. 9 between computing device 902, server 904, communication network 906, and all subcomponents depicted are exemplary and may be modified to reduce processing time or enhance processing capabilities for each step in the processes disclosed herein by one skilled in the art.

Terminology

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least one exemplary embodiment is described as using a plurality of units or modules to perform the exemplary process, it is understood that the exemplary processes may also be performed by one or a plurality of units or modules. Additionally, it is understood that the term controller/control unit may refer to a hardware device that includes a memory and a processor. The memory may be configured to store the units or the modules and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", and so on, herein, are provided to identify structures or operations, without describing an order of structures or operations, and, to the extent the structures or operations are used in an exemplary embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), etc.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

This specification discloses embodiments, which include, but are not limited to, the following items:

Item 1. A method for video compression, the method comprising:

estimating, with a rate controller operatively connected with an encoder, a quantization parameter of at least a portion of a picture of a variable bitrate input;

determining an encoded picture size of the picture;

determining a required rate based on the encoded picture size and a frame rate of the encoder;

determining a capped variable bitrate of the variable bitrate input;

comparing the required bitrate with the capped variable bitrate; and transmitting the picture or at least one of partitioning a frame, reconfiguring a frame, or adjusting the quantization parameter based on the comparing.

Item 2. The method of item 1, comprising:

setting a starting quantization parameter equal to the quantization parameter of the at least the portion of the picture plus an interval.

Item 3. The method of item 2, wherein the interval is an integer, and the integer is 1.

Item 4. The method of item 2 or 3, comprising setting an ending quantization parameter equal to a maximum supported encoder quantization parameter value.

Item 5. The method of item 4, comprising comparing the starting quantization parameter to the ending quantization parameter.

Item 6. The method of item 5, comprising in response to determining that the starting quantization parameter is greater than the ending quantization parameter, setting a new quantization parameter equal to a ratio of the starting quantization parameter to the ending quantization parameter.

Item 7. The method of item 6, wherein the ratio is 1:2.

Item 8. The method of item 6 or 7, comprising sending an intra picture generation request with the new quantization parameter to the encoder; and generating, with the encoder, an intra picture with the new quantization parameter.

Item 9. The method of any one of items 5-8, comprising in response to determining that the starting quantization parameter is not less than or equal to the ending quantization parameter, modifying the picture by at least one of changing a resolution of the picture, changing a framerate of the picture, or reducing the encoded picture size of the picture, and transmitting the modified picture to the encoder.

Item 10. The method of any one of items 1-9 comprising:

receiving, from the rate controller, the encoded picture with a multiplexer;

combining, with the multiplexer, the encoded picture with multimedia stream data from the variable bitrate input into an encoded video stream; and transmitting the encoded video stream to a client.

Item 11. The method of item 10, wherein the client is a thin client comprising a video decoder and a user interaction module, the thin client configured to transmit user commands from the user interaction module to a cloud gaming platform.

Item 12. The method of item 11 comprising:

receiving, with the cloud gaming platform, the user commands;

processing the user commands with a thin client interaction module to generate game actions;

receiving, with a game logic module, the game actions to generate game world changes;

processing the game world changes with a graphics processing unit rendering module to generate a rendered scene; and receiving the rendered scene with the encoder.

Item 13. The method of item 12 comprising, after the receiving of the rendered scene with the encoder, repeating, for a next picture, the:

estimating, with the rate controller operatively connected to the encoder, the quantization parameter of the next picture of the variable bitrate input;

determining the encoded picture size of the next picture;

determining the required rate based on the encoded picture size and the frame rate of the encoder;

determining the capped variable bitrate of the variable bitrate input;

comparing the required bitrate with the capped variable bitrate; and transmitting the picture or at least one of partitioning a frame, reconfiguring a frame, or adjusting the quantization parameter based on the comparing.

Item 14. A system for video compression, the system comprising:

a rate controller operatively connected with an encoder, the rate controller configured to:

estimate a quantization parameter of at least a portion of a picture of a variable bitrate input;

determine an encoded picture size of the picture;

determine a required rate based on the encoded picture size and a frame rate of the encoder;

determine a capped variable bitrate of the variable bitrate input;

compare the required bitrate with the capped variable bitrate; and transmit the picture or at least one of partitioning a frame, reconfiguring a frame, or adjusting the quantization parameter based on the comparing.

Item 15. The system of item 14, the rate controller configured to:

set a starting quantization parameter equal to the quantization parameter of the at least the portion of the picture plus an interval.

Item 16. The system of item 15, wherein the interval is an integer, and the integer is 1.

Item 17. The system of item 15 or 16, the rate controller configured to:

set an ending quantization parameter equal to a maximum supported encoder quantization parameter value.

Item 18. The system of item 17, the rate controller configured to:

compare the starting quantization parameter to the ending quantization parameter. Item 19. The system of item 18, the rate controller configured to:

in response to determining that the starting quantization parameter is greater than the ending quantization parameter, set a new quantization parameter equal to a ratio of the starting quantization parameter to the ending quantization parameter.

Item 20. The system of item 19, wherein the ratio is 1:2.

Item 21. The system of item 19 or 20, the rate controller configured to:

send an intra picture generation request with the new quantization parameter to the encoder; and generate, with the encoder, an intra picture with the new quantization parameter.

Item 22. The system of any one of items 18-21, the rate controller configured to:

in response to determining that the starting quantization parameter is not less than or equal to the ending quantization parameter, modify the picture by at least one of changing a resolution of the picture, changing a framerate of the picture, or reducing the encoded picture size of the picture, and transmitting the modified picture to the encoder.

Item 23. The system of any one of items 14-22 comprising:

a multiplexer configured to:

receive, from the rate controller, the encoded picture;

combine the encoded picture with multimedia stream data from the variable bitrate input into an encoded video stream; and transmit the encoded video stream to a client.

Item 24. The system of item 23, wherein the client is a thin client comprising a video decoder and a user interaction module, the thin client configured to transmit user commands from the user interaction module to a cloud gaming platform.

Item 25. The system of item 24, the cloud gaming platform configured to:

receive the user commands;

process the user commands with a thin client interaction module to generate game actions;

receive, with a game logic module, the game actions to generate game world changes;

process the game world changes with a graphics processing unit rendering module to generate a rendered scene; and receive the rendered scene with the encoder.

Item 26. The system of item 25 comprising, after the receiving of the rendered scene with the encoder, repeating, for a next picture, the:

estimating, with the rate controller operatively connected to the encoder, the quantization parameter of the next picture of the variable bitrate input;

determining the encoded picture size of the next picture;

determining the required rate based on the encoded picture size and the frame rate of the encoder;

determining the capped variable bitrate of the variable bitrate input;

comparing the required bitrate with the capped variable bitrate; or transmitting the next picture or at least one of partitioning a frame, reconfiguring a frame, or adjusting the quantization parameter based on the comparing.

Item 27. A non-transitory, computer-readable medium having non-transitory, computer-readable instructions encoded thereon for video compression with a rate controller operatively connected with an encoder, that, when executed:

estimate, with the rate controller operatively connected with the encoder, a quantization parameter of at least a portion of a picture of a variable bitrate input;

determine an encoded picture size of the picture;

determine a required rate based on the encoded picture size and a frame rate of the encoder;

determine a capped variable bitrate of the variable bitrate input;

compare the required bitrate with the capped variable bitrate; and transmit the picture or at least one of partitioning a frame, reconfiguring a frame, or adjusting the quantization parameter based on the comparing.

Item 28. The non-transitory, computer-readable medium of item 27, comprising instructions that, when executed:

set a starting quantization parameter equal to the quantization parameter of the at least the portion of the picture plus an interval.

Item 29. The non-transitory, computer-readable medium of item 28, wherein the interval is an integer, and the integer is 1.

Item 30. The non-transitory, computer-readable medium of item 28 or 29, comprising instructions that, when executed set an ending quantization parameter equal to a maximum supported encoder quantization parameter value.

Item 31. The non-transitory, computer-readable medium of item 30, comprising instructions that, when executed compare the starting quantization parameter to the ending quantization parameter.

Item 32. The non-transitory, computer-readable medium of item 31, instructions that, when executed in response to determining that the starting quantization parameter is greater than the ending quantization parameter, set a new quantization parameter equal to a ratio of the starting quantization parameter to the ending quantization parameter.

Item 33. The non-transitory, computer-readable medium of item 32, wherein the ratio is 1:2.

Item 34. The non-transitory, computer-readable medium of item 32 or 33, comprising instructions that, when executed send an intra picture generation request with the new quantization parameter to the encoder; and generate, with the encoder, an intra picture with the new quantization parameter.

Item 35. The non-transitory, computer-readable medium of any one of items 31-34, comprising instructions that, when executed in response to determining that the starting quantization parameter is not less than or equal to the ending quantization parameter, modify the picture by at least one of changing a resolution of the picture, changing a framerate of the picture, or reducing the encoded picture size of the picture, and transmit the modified picture to the encoder.

Item 36. The non-transitory, computer-readable medium of any one of items 27-35 comprising instructions that, when executed:

receive, from the rate controller, the encoded picture with a multiplexer;

combine, with the multiplexer, the encoded picture with multimedia stream data from the variable bitrate input into an encoded video stream; and transmit the encoded video stream to a client.

Item 37. The non-transitory, computer-readable medium of item 36, wherein the client is a thin client comprising a video decoder and a user interaction module, the thin client configured to transmit user commands from the user interaction module to a cloud gaming platform.

Item 38. The non-transitory, computer-readable medium of item 36 or 37 comprising instructions that, when executed:

receive, with the cloud gaming platform, the user commands;

process the user commands with a thin client interaction module to generate game actions;

receive, with a game logic module, the game actions to generate game world changes;

process the game world changes with a graphics processing unit rendering module to generate a rendered scene; and receive the rendered scene with the encoder.

Item 39. The non-transitory, computer-readable medium of item 38 comprising instructions that, when executed, after the receiving of the rendered scene with the encoder, repeat, for a next picture, the instructions to:

estimate, with the rate controller operatively connected to the encoder, the quantization parameter of the next picture of the variable bitrate input;

determine the encoded picture size of the next picture;

determine the required rate based on the encoded picture size and the frame rate of the encoder;

determine the capped variable bitrate of the variable bitrate input;

compare the required bitrate with the capped variable bitrate; and transmit the picture or at least one of partitioning a frame, reconfiguring a frame, or adjusting the quantization parameter based on the comparing.

Item 40. A device for video compression, the device comprising:

means for estimating, with a means for rate controlling operatively connected with a means for encoding, a quantization parameter of at least a portion of a picture of a variable bitrate input;

means for determining an encoded picture size of the picture;

means for determining a required rate based on the encoded picture size and a frame rate of the encoder;

means for determining a capped variable bitrate of the variable bitrate input;

means for comparing the required bitrate with the capped variable bitrate; and means for transmitting the picture or at least one of partitioning a frame, reconfiguring a frame, or adjusting the quantization parameter based on the comparing.

Item 41. The device of item 40, comprising:

means for setting a starting quantization parameter equal to the quantization parameter of the at least the portion of the picture plus an interval.

Item 42. The device of item 41, wherein the interval is an integer, and the integer is 1.

Item 43. The device of item 41 or 42, comprising means for setting an ending quantization parameter equal to a maximum supported encoder quantization parameter value.

Item 44. The device of item 43, comprising means for comparing the starting quantization parameter to the ending quantization parameter.

Item 45. The device of item 44, comprising in response to determining that the starting quantization parameter is greater than the ending quantization parameter, means for setting a new quantization parameter equal to a ratio of the starting quantization parameter to the ending quantization parameter.

Item 46. The device of item 45, wherein the ratio is 1:2.

Item 47. The device of item 45 or 46, comprising means for sending an intra picture generation request with the new quantization parameter to the encoder; and generating, with the encoder, an intra picture with the new quantization parameter.

Item 48. The device of any one of items 44-47, comprising in response to determining that the starting quantization parameter is not less than or equal to the ending quantization parameter, means for modifying the picture by at least one of means for changing a resolution of the picture, means for changing a framerate of the picture, or means for reducing the encoded picture size of the picture, and transmitting the modified picture to the encoder.

Item 49. The device of any one of items 40-48 comprising:

means for receiving, from the rate controller, the encoded picture with a multiplexer;

means for combining, with the multiplexer, the encoded picture with multimedia stream data from the variable bitrate input into an encoded video stream; and means for transmitting the encoded video stream to a client.

Item 50. The device of any one of items 40-49, wherein the client is a thin client comprising a means for video decoding and a means for user interaction, the thin client configured to transmit user commands from the user interaction module to the device.

Item 51. The device of item 50, wherein the device comprises:

means for receiving, with the cloud gaming platform, the user commands;

means for processing the user commands with a thin client interaction module to generate game actions;

means for receiving, with a game logic module, the game actions to generate game world changes;

means for processing the game world changes with a graphics processing unit rendering module to generate a rendered scene; and receiving the rendered scene with the means for encoding.

Item 52. The device of item 51 comprising, after the receiving of the rendered scene with the means for encoding, repeating, with the device, for a next picture, the:

estimating, with the means for rate controlling of the means for encoding, the quantization parameter of the next picture of the variable bitrate input;

determining the encoded picture size of the next picture;

determining the required rate based on the encoded picture size and the frame rate of the encoder;

determining the capped variable bitrate of the variable bitrate input;

comparing the required bitrate with the capped variable bitrate; and transmitting the picture or at least one of partitioning a frame, reconfiguring a frame, or adjusting the quantization parameter based on the comparing.

While some portions of this disclosure may refer to "convention" or "conventional" examples. Any such reference is merely to provide context to the instant disclosure and does not form any admission as to what constitutes the state of the art.

Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:

1. A method for video compression, the method comprising:

estimating, with a rate controller operatively connected with an encoder, a quantization parameter value of at least a portion of a picture of a variable bitrate input;

determining an encoded picture size of the picture;

determining a required bitrate based on the encoded picture size and a frame rate of the encoder;

determining a capped variable bitrate of the variable bitrate input;

comparing the required bitrate with the capped variable bitrate;

based at least in part on determining that the required bitrate exceeds the capped variable bitrate, calculating an adjusted quantization parameter value equal to the quantization parameter value of the at least the portion of the picture plus an interval;

based at least on determining that the adjusted quantization parameter value is less than or equal to a maximum quantization parameter value supported by the encoder, calculating a new quantization parameter value equal to a ratio multiplied by a sum of the adjusted quantization parameter value and the maximum quantization parameter value supported by the encoder; and encoding the picture using the new quantization parameter value.

2. The method of claim 1, wherein the interval is an integer, and the integer is 1.

3. The method of claim 1, further comprising comparing the adjusted quantization parameter value to the maximum quantization parameter value supported by the encode.

4. The method of claim 1, wherein the ratio is 1:2.

5. The method of claim 1, wherein encoding the picture using the new quantization parameter value comprises:

sending an intra picture generation request with the new quantization parameter value to the encoder; and generating, with the encoder, an intra picture with the new quantization parameter value.

6. The method of claim 1, comprising in response to determining that the adjusted quantization parameter value is not less than or equal to the maximum quantization parameter value supported by the encoder;

modifying the picture by at least one of changing a resolution of the picture, changing a framerate of the picture, or reducing the encoded picture size of the picture; and transmitting the modified picture to the encoder.

7. The method of claim 6, wherein the modifying the picture by at least one of changing the resolution of the picture, changing the framerate of the picture, or reducing the encoded picture size of the picture comprises:

partitioning a frame at a scene change to re-distribute new picture data comprising intra coded macroblocks into a sequence of multiple frames in a row; and encoding portions of the picture corresponding to repeat picture data from a previous scene using skipped macroblocks.

8. The method of claim 6, wherein the modifying the picture by at least one of changing the resolution of the picture, changing the framerate of the picture, or reducing the encoded picture size of the picture comprises:

terminating the encoding of the picture at a scene change based at least in part on determining that a number of accumulated bits for the picture greater than or equal to a calculated bit allowance; and encoding a remaining portion of the picture after termination using skipped macroblocks or copied picture data.

9. The method of claim 1, further comprising:

determining a scene change will occur within a predetermined time period;

determining a probability of the picture being dropped at a client device due to the required bitrate exceeding the capped variable bitrate, wherein the determining is based on the picture being encoded at the scene change; and based at least in part on determining that the probability of the picture being dropped exceeds a predetermined standard, generating an instantaneous decoder refresh (IDR) frame for a subsequent picture using the new quantization parameter value.

10. A system for video compression, the system comprising:

a rate controller operatively connected with an encoder, the rate controller configured to:

estimate a quantization parameter value of at least a portion of a picture of a variable bitrate input;

determine an encoded picture size of the picture;

determine a required bitrate based on the encoded picture size and a frame rate of the encoder;

determine a capped variable bitrate of the variable bitrate input;

compare the required bitrate with the capped variable bitrate;

based at least in part on determining that the required bitrate exceeds the capped variable bitrate, calculate an adjusted quantization parameter value equal to the quantization parameter value of the at least the portion of the picture plus an interval;

based at least on determining that the adjusted quantization parameter value is less than or equal to a maximum quantization parameter value supported by the encoder, calculate a new quantization parameter value equal to a ratio multiplied by a sum of the adjusted quantization parameter value and the maximum quantization parameter value supported by the encoder; and encode the picture using the new quantization parameter value.

11. The system of claim 10, wherein the interval is an integer, and the integer is 1.

12. The system of claim 10, wherein the rate controller is further configured to:

compare the adjusted quantization parameter value to the maximum quantization parameter value supported by the encode.

13. The system of claim 10, wherein the ratio is 1:2.

14. The system of claim 10, wherein the rate controller encodes the picture using the new quantization parameter value by:

> sending an intra picture generation request with the new quantization parameter value to the encoder; and
>
> generating, with the encoder, an intra picture with the new quantization parameter value.

15. The system of claim 10, wherein the rate controller configured to:

> in response to determining that the adjusted quantization parameter value is not less than or equal to the maximum quantization parameter value supported by the encoder;
>
> modify the picture by at least one of changing a resolution of the picture, changing a framerate of the picture, or reducing the encoded picture size of the picture; and
>
> transmit the modified picture to the encoder.

16. A non-transitory, computer-readable medium having non-transitory, computer-readable instructions encoded thereon for video compression with a rate controller operatively connected with an encoder, that, when executed:

> estimate, with the rate controller operatively connected with the encoder, a quantization parameter value of at least a portion of a picture of a variable bitrate input;
>
> determine an encoded picture size of the picture;
>
> determine a required bitrate based on the encoded picture size and a frame rate of the encoder;
>
> determine a capped variable bitrate of the variable bitrate input;
>
> compare the required bitrate with the capped variable bitrate;
>
> based at least in part on determining that the required bitrate exceeds the capped variable bitrate, calculate an adjusted quantization parameter value equal to the > quantization parameter value of the at least the portion of the picture plus an interval;
>
> based at least on determining that the adjusted quantization parameter value is less than or equal to a maximum quantization parameter value supported by the encoder, calculate a new quantization parameter value equal to a ratio multiplied by a sum of the adjusted quantization parameter value and the maximum quantization parameter value supported by the encoder; and
>
> encode the picture using the new quantization parameter value.

17. The non-transitory, computer-readable medium of claim 16, wherein the interval is an integer, and the integer is 1.

18. The non-transitory, computer-readable medium of claim 16, wherein the ratio is 1:2.

19. The non-transitory, computer-readable medium of claim 16, wherein the instructions that cause encoding of the picture using the new quantization parameter value, further comprise instructions, that when executed:

> send an intra picture generation request with the new quantization parameter value to the encoder; and
>
> generate, with the encoder, an intra picture with the new quantization parameter value.

20. The non-transitory, computer-readable medium of claim 16, comprising instructions, that when executed:

> in response to determining that the adjusted quantization parameter value is not less than or equal to the maximum quantization parameter value supported by the encoder:
>
> > modify the picture by at least one of changing a resolution of the picture, changing a framerate of the picture, or reducing the encoded picture size of the picture; and
> >
> > transmitting the modified picture to the encoder.

\* \* \* \* \*